United States Patent [19]

Shahid

[11] Patent Number: 5,795,923
[45] Date of Patent: Aug. 18, 1998

[54] PHOTO-DEGRADABLE SHOTSHELL OF POLYETHYLENE AND EVA-CO TERPOLYMER

[75] Inventor: Mohammed Shahid, Minneapolis, Minn.

[73] Assignee: Federal Cartridge Company, Anoka, Minn.

[21] Appl. No.: 543,946

[22] Filed: Oct. 17, 1995

[51] Int. Cl.⁶ .............................. F42B 5/30; C08K 3/20; C08K 5/095; C08L 23/06
[52] U.S. Cl. .................. 523/125; 102/466; 102/467; 102/532; 524/306; 524/400; 524/436; 524/502; 525/185
[58] Field of Search .................. 523/125; 525/190, 525/185; 102/466, 467, 532; 524/306, 400, 436, 502

[56] References Cited

U.S. PATENT DOCUMENTS

| | | |
|---|---|---|
| 3,780,140 | 12/1973 | Hammer . |
| 4,394,459 | 7/1983 | Rys-Sikora .......................... 521/84 |
| 4,881,963 | 11/1989 | Fujita et al. ........................ 71/64.07 |
| 5,009,696 | 4/1991 | Fujita et al. ........................ 71/64.07 |
| 5,549,048 | 8/1996 | Godfrey-Phillips et al. ........ 523/126 |

FOREIGN PATENT DOCUMENTS

WO9105982  5/1991  WIPO .

OTHER PUBLICATIONS

Dupont brochure on Elvalloy 741 and 742 resin modifiers (no date).
Federal Register, vol. 59, No. 40, Tuesday, Mar. 1, 1994, Rules and Regulations, pp. 9866–9770, inclusive.
Extract taken from Kirk/Othmer Encyclopedia of Chemical Technology, 3d Edition, 1978, Supplement Volume, pp. 626–627, inclusive, pp. 648–668, inclusive.
C.J. Kmiec article entitled "Ethylene–Carbon Monoxide Copolymer: The Established Degradable Plastic," Union Carbide Chemicals & Plastic Company, Inc. (no date).
Florida Test Rules for Degradable Materials, Chapter 17–707, pp. 1–8, inclusive (1993).
Encyclopedia of Polymer Science and Engineering, vol. 10, 2d Edition, 1985—Olefin–Carbon Monoxide Copolymers, pp. 369–373, inclusive.

Primary Examiner—Robert E. Sellers
Attorney, Agent, or Firm—Schroeder & Siegfried, P.A.

[57] ABSTRACT

A photo-degradable, molded, high strength plastic shotshell component having a degradation composition comprising as its combination of active ingredients linear polyethylene having a melt index of 0.1 to 5.0 and an ethylene-vinyl acetate-carbon monoxide terpolymer, the ratios by weight of which to said linear polyethylene is approximately 0.115:1 to 0.261:1 The ethylene-vinyl acetate-carbon monoxide terpolymer in its preferred composition has about 65% by weight of ethylene, 25% by weight of vinyl acetate, and 10% by weight of carbon monoxide.

35 Claims, 1 Drawing Sheet

PHOTO-DEGRADABLE SHOTSHELL OF POLYETHYLENE AND EVA-CO TERPOLYMER

BACKGROUND OF THE INVENTION plastic components of shotshells, such as wads and shotcups (pouches) have been manufactured of plastic non-degradable materials for many years. The firing of such shotshells have littered, with such components, the outdoors, wherever such shotshells have been fired. In recent years, environmentalists and others have called attention to such littering, which has increased annually, and are currently demanding that the use of such non-degradable components cease. My invention is directed toward meeting such demands.

During many early years, environmental degradability was studied extensively in an effort to increase the useful life of products such as textiles, coatings, electrical insulation, boats, house sidings and many other durable goods made from polymers. The protection and stabilization of polymeric materials is very important economically, and often is vital to the public health and safety.

Since the 1970's, however, many scientists have sought to produce plastic items which will degrade with prediction when exposed to the elements of the environment. Some of these efforts have been directed to degradation from sunlight. Others have studied degradation from microorganisms. Still others have sought degradation through absorption by the human body, for use in medical practices.

Degradation can be classified into different types. Environmental degradation of plastics is sought from exposure to the combined environmental effects of sunlight, microorganisms, insects, animals, heat, water, oxygen, wind, rain, traffic, etc. Biodegradation is caused by the action of living organisms such as fungi and bacteria. Oxidative degradation is caused by the action of oxygen and ozone. photodegration results from exposure to sunlight, particularly the ultraviolet rays thereof, and to other intense sources of light. My invention, as disclosed and claimed herein is of this latter type in that, due to the particular composition of the plastic material from which the shotshell components will be made, such components will degrade and disintegrate, when exposed to the environmental elements, within a relatively short period of time. Shotshell components such as, for example, wads and shot-cups (pouches), have stringent strength requirements. In addition, recent increased attention to environmental considerations has aroused considerable interest in the need to cause such components to disintegrate shortly after having been spent in the firing of the shotshell which carries these components. My invention is applied in that direction.

It has been recognized for quite some time that polyethylene has substantial strength and other desirable engineering properties which readily lend themselves advantageously to the manufacture and use of shotshell components such as wads, shot-cups and casings. Branch polyethylene has been used previously in the manufacture of such shotshell components, but unfortunately such material is not sufficiently strong and is not photodegradable to obviate the littering problem described above. Linear polyethylene, like branch polyethylene, is not sufficiently photodegradable. However, linear polyethylene has better engineering properties for use in the manufacturing procedures of shotshell components.

photodegradable polymers become brittle within a specified exposure time and then disintegrate from the action of forces, such as traffic, wind, rain, and other physical contacts. Different rates of degradation are obtainable to accomplish various desires and such rates vary with the application.

Higher strength moldable photodegradable plastic materials, when molded into plastic components for shotgun shell application, must yield appropriate strength to meet the ballistic performance requirements for shotgun shells at:

(a) room temperature conditions, on up to 150° F., (b) 32° F. temperature conditions, and (c) –20° F. temperature conditions.

Many plastic materials may function adequately at room temperature conditions or higher, for example, but fail miserably at low temperature conditions, such as –20° F., temperature conditions. My primary object is to provide components for shotshells which will function adequately under each of the above temperature conditions, and will readily degrade shortly after being fired.

Currently the plastic components of shotgun shells are based in polyethylene or co-polymers of ethylene, hexene, butene, pentene and others. polyethylene and co-polymers of ethylene polymer systems remain intact in the environment for a very long period. These plastic components, after serving their purpose, not only remain as litter, but also pose threats to the animal and marine life. In an effort to solve the above problems, I have tried the use of previously known photodegradable plastic materials (in place of the above polyethylene polymer system) in the manufacture and testing of such shotgun shell components.

In so doing, I knew of each of the following photodegradable polymer systems and, therefore, I molded and tested various plastic components of shotshells from each:

(1) The ECO polymer system (copolymer of ethylenecarbon monoxide) from Union Carbide Company, (2) Kent plastic materials, as described and claimed in patent No. WO9105982, (3) FCP plastic material as described and claimed in U.S. Pat. No. 5,087,650, (4) Ecolyte E.

The polymer system (1), ECO polymer system, is a copolymer of ethylene and carbon monoxide. I manufactured wads and shot-cups (pouches) from this material and tested same for desired shotgun shell applications. This plastic material system failed in our ballistic testing.

I then tried the polymer system (2), which consists of the Kent plastic material, which is a starch loaded polyethylene. The photosensitive mechanism of that system is based in the oxidizing agent, Cobalt Naphthnate and the photosensitive copolymer of styrene-butadiene. The above components of shotgun shells were manufactured and tested from this material, but they also failed in our subsequent ballistic testing thereof.

I also explored the possible use of FCP (Fully Compounded plastic) (3) plastic materials. These materials are comprised of very high starch-loaded polyethylene and copolymer of ethylene and acrylates. The photosensitive mechanism is based in ferric and ferrous salts. This material was used as a master batch in combination with polyethylene systems. The blend was molded into wads and shot-cups (pouches) and tested for shotgun shell applications. This material system also failed in our ballistic testing. I also experienced difficulties in utilizing injection molding processes with this material.

The Ecolyte E system is a copolymer of ethylene and methyl vinyl ketone. I also manufactured the above shotshell components of this material and, upon testing same, found that they could not meet our ballistic requirements. In each of the above systems, the failure in ballistic testing consisted of structural failure upon firing and associated lowering of velocity of the shot.

As a result of the above testing, I concluded:

(1) Each of the above systems failed to yield adequate strength for shotgun shell applications.

(2) Currently available starch-loaded polymer systems are not adequately suitable for shotgun shell applications.

(3) photodegradable plastic materials, which are based upon the inclusion of an oxidizing agent, peroxides and other free radical-generating compounds, substantially shorten the shelf life of shotgun shells made of such materials and, hence, are inadequate for that purpose.

(4) None of the above materials will function adequately in such shotgun shell components under low temperature conditions. Each of them failed in our testing under such conditions.

In conclusion, linear and branched polyethylene polymer systems of appropriate molecular weight and melt index are being used as plastic components of shotgun shells. Such systems are best suited for such applications, because of the following attributes of the polymer system:

(1) They are comprised of a benign and inert material.

(2) They provide outstanding cold temperature physical strength which is needed for shotgun shell applications.

(3) They have excellent molding and engineering properties.

(4) They are relatively economical, particularly the branch polyethylene.

(5) They are readily recyclable.

One problem with the polyethylene polymer, however, is that it remains intact in the environment for a very long period of time. Thus, the objection to littering is particularly applicable to users of shotgun shells which have polyethylene components. In the light of the above testing results, I turned our attention to the problem of somehow making suitable polyethylene polymers photo-sensitive without destroying their physical strength. I reasoned that, if this could be accomplished, shotgun shell components made of such materials would function adequately and would disintegrate and become assimilated into the natural environment, within a reasonable length of time subsequent to being fired.

I know that polyethylene and copolymers of ethylene systems can be made photosensitive by adding various transition metal salts thereto or by mixing them with auto-oxidizable polymers such as polypropylene and poly (ethylene oxide) or the combination of both (the metal salt and the auto-oxidizable polymer system). The most active of these salts are cobalt, iron, manganese and cerium.

In addition to the use of metal salts and autooxidizable polymers, I know that many organic compounds, such as peroxides, peracids, aromatic ketone, diketones, quinones, nitraso compound and dyes will sensitize the polymers to make them photosensitive.

The drawbacks of the degradable plastic materials, based upon the above approaches for use in shotgun shell applications, are as follows:

(1) The shelf life of the shotshell components is questionable, because of the labile nature of the systems, due to the presence of oxidizing agents and the auto-oxidative polymer in the mixture.

(2) The inclusion and mixing of low molecular weight organic compounds can severely adversely affect the physical strength characteristics in general, and in particular, the cold temperature properties of the polyethylene polymer system.

(3) Complicated and complex compounding and molding processes of the mixture (polyethylene and the additives mentioned above) are required.

(4) Many of the above additives are relatively costly and, hence, the economics of the polymer systems for such shotgun shell components are adversely affected.

I concluded that the best alternative of the above additive approaches for enhancing polymer degradability is to attempt to incorporate a photosensitive group into the polymer molecule during polymerization. I concluded that copolymerization with carbon monoxide or vinyl ketone would be a preferred method. The commercially available copolymers of (a) ethylene-carbon monoxide, and (b) ethylene-methyl vinyl ketones were tried for the applications, but both polymer systems failed for the plastic components for the shotgun applications. Later, I conceived of the invention and was successful, as hereinafter described, in producing photodegradable shotshell components of satisfactory strength and performance.

As a result of a search which I have caused to be made, a number of patents were developed. The patents which were reported as a result of this search are as follows:

U.S. Pat. No. 3,780,140
U.S. Pat. No. 4,394,459
U.S. Pat. No. 4,881,963
U.S. Pat. No. 5,009,696

U.S. Pat. No. 3,780,140 discloses Ethylene/carbon monoxide polymer compositions consisting of copolymers of ethylene, carbon monoxide and one or more termonomers copolymerizable therewith to produce solid products over extremely wide ranges. It is an early patent issued to E. I. Dupont de Nemours and Company of Wilmington, Delaware. This patent has expired. The product which I use is manufactured by that company. This product, however, is not disclosed in said patent.

U.S. Pat. No. 4,394,459 discloses a cross-linked closed-cell microcellular article of a terpolymer, carbon monoxide, and a softening monomer.

U.S. Pat. No. 4,881,963 discloses a granular fertilizer with a degradable plastic coating which is comprised of an ethylene-carbon monoxide copolymer as its indispensable component. To this component is added either a rubbery resin, or an ethylene-vinyl acetate copolymer resin as an optional component, to produce a coating which degrades in sunlight to gradually release the fertilizer and complete the degradation.

U.S. Pat. No. 5,009,696 is a continuation patent of the above U.S. Pat. No. 4,881,963 which is directed to the polymer of ethylene-vinyl acetate, and carbon monoxide being added in controlled amounts to adjust and control the rate of release of the fertilizer which is encapsulated within the coating. No suggestion is made to add the polymer to linear/polyethylene to provide a high strength injection moldable thermoplastic molding compound.

After testing the four above systems which I knew were photodegradable, and finding that none of them were suitable for manufacturing shotshell components therefrom, I investigated polyethylene. I found that branch polyethylene had adequate strength for some components, but not for others. More importantly, I found it inadequate at low temperatures. I found, however, that linear polyethylene, having a melt index of 0.1–5.0, has adequate strength, even at −20° F. Unfortunately, however, I found that neither branch nor linear polyethylene is sufficiently photodegradable.

BRIEF SUMMARY OF THE INVENTION

I did extensive research to find the solutions for the problems I encountered with the commercial available and already developed photodegradable plastic materials for shotgun shell applications. My objective was to develop a photodegradable plastic material having adequate strength, appropriate processing properties, non-excessive costs, adequate shelf life, and good performance across the entire temperature range of 150° F. to –20° F. I have found that the photodegradable plastic material which exceeds appropriate strength for the application and performs well over the entire above temperature range is based in a mixture of 0.1 –5.0 melt index linear polyethylene polymer system and the terpolymer of ethylene-vinyl acetate-carbon monoxide in certain ratios by weight and composition.

BRIEF DESCRIPTION OF THE DRAWINGS

These and other objects and advantages of the invention will more fully appear from the following description, made in connection with the accompanying drawings, wherein like reference characters refer to the same or similar parts throughout the several views, and in which.

DETAILED DESCRIPTION OF THE INVENTION

Figure 1:
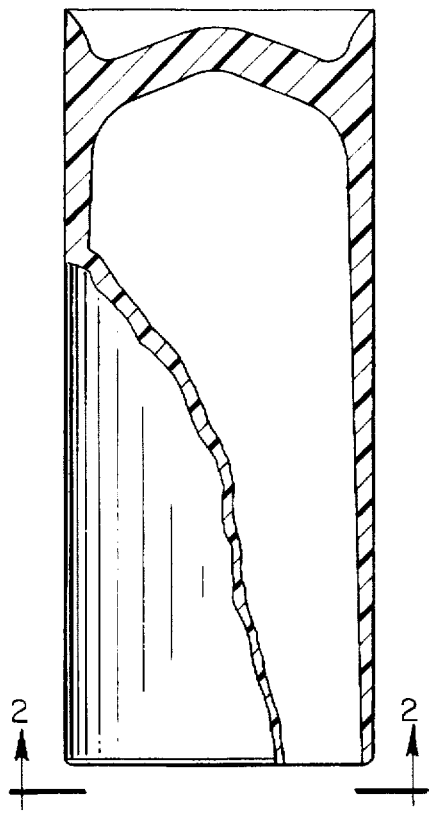
FIG. 1 is a side elevational view of an inverted tubular shot-cup (pouch) with portions thereof broken away and made of linear polyethylene polymerized in accordance with my invention.
Figure 3:
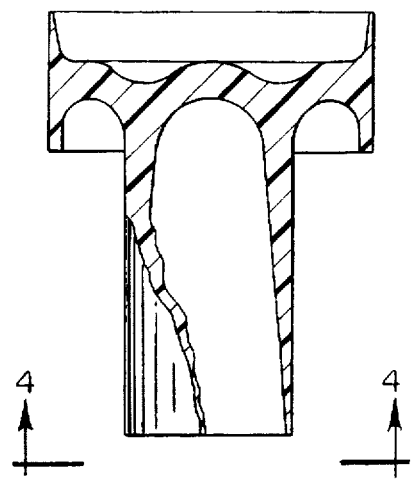
FIG. 3 is a side elevational view of an inverted tubular shotshell wad made of linear polyethylene polymerized in accordance with my invention, with a portion thereof broken away.
Figure 2:
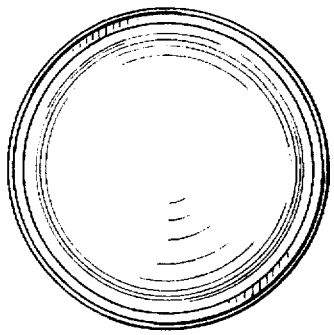
FIG. 2 is an open-end elevational view of the shot-cup shown in FIG. 1.
Figure 4:
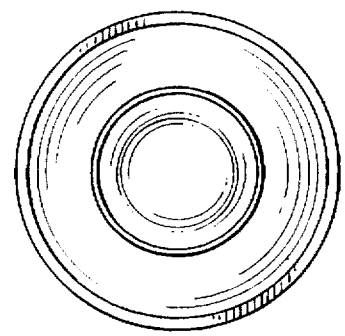
FIG. 4 is an open end elevational view of the wad shown in FIG. 3.

As indicated above, I had concluded that the best alternative for enhancing polymer degradability is to attempt to incorporate a photosensitive group into the polymer molecule during polymerization. Despite the negative results as outlined above, I decided to seek to introduce a terpolymer, rather than a copolymer, having carbon monoxide as one component of its composition. In accord therewith, I selected linear polyethylene, because of its inherent strength and the terpolymer ethylene-vinyl acetate-carbon monoxide, because it is readily miscible with linear polyethylene and has carbon monoxide as a component thereof.

I obtained the ethylene-vinyl acetate-carbon monoxide terpolymer, which I deemed suitable, by purchasing Elvalloy 741, which is a commercial available product, from E. I. Dupont de Nemours and Company of Wilmington, Delaware. That product is comprised of 65% by weight of ethylene, 25% by weight of vinyl acetate, and 10% by weight of carbon monoxide.

I prepared and tested three mixtures based in the following compositions:

(1) 86.60% by weight of linear polyethylene (Solvay T-50-200),
   10.00% by weight of ethylene-vinyl acetate-carbon monoxide,
   3.00% by weight of low barium content calcium oxide,
   0.30% by weight of vegetable oil, and
   0.10% by weight of calcium stearate.

(2) 81.60% by weight of linear polyethylene (Solvay T-50-200),
   15.00% by weight of ethylene-vinyl acetate-carbon monoxide,
   3.00% by weight of low barium content calcium oxide,
   0.30% by weight of vegetable oil, and
   0.10% by weight of calcium stearate.

(3) 74.60% by weight of linear polyethylene (Solvay T-50-200),
   20.00% by weight of ethylene-vinyl acetate-carbon monoxide,
   3.00% by weight of low barium content calcium oxide,
   0.30% by weight of vegetable oil, and
   0.10% by weight of calcium stearate. Linear polyethylene (Solvay T-50-200) can be purchased from Solvay polymers, Inc., Technical Center, 1230 Battleground Road, P.O. Box 1000, Deer park, Tex. 77536.

The calcium oxide, which has the lowest barium level, was added to the polyethylene and the terpolymer in amounts of 0.1%–5.0% by weight to react with any of the vinyl acetate which might liberate during injection molding and compounding operations. The calcium stearate acts as a lubricant and the vegetable oil functions as a release agent. The calcium stearate is added in amounts of 0.01%–0.5% by weight. The vegetable oil is added in amounts of 0.1%–1.0% by weight.

From the compositions (1)–(3) shown above, it can be seen that my invention can be practiced effectively, to produce photodegradable linear polyethylene, by introducing an ethylene-vinyl acetate-carbon monoxide polymer into the linear polyethylene matrix in amounts of 10–20% by weight of the mix composition. It will be noted that the end product of the composition in which the terpolymer constitutes 15% by weight of the composition is readily moldable, photodegradable, non-toxic, and functions well at –20° F.

The above-mentioned mixtures were dry blended, extruded and pelletized by methods well known in the art of small arms ammunition manufacturing, and then injection molded into plastic components such as wads and shot-cups for shotgun shell applications. Shotgun shells were made, using these plastic components therein, and were tested for ballistic properties. After qualifying for their suitability for gunshot applications, the above three mixtures were tested for photodegradability, based upon EpA (Environmental protection Agency) guidelines and were found to be highly satisfactory in that they degraded in the testing sufficiently rapidly to meet the photodegradability requirements and, upon the degradation, the material thereof was found to be safe for the environment. These photodegradability standards are the state and federal requirements which requires photodegradability to be evident upon exposure to 371.5 hours in q.u.v. machines.

I use the ethylene-vinyl acetate-carbon monoxide terpolymer for two reasons. One reason is that this terpolymer is freely miscible with polyethylene to readily provide a homogeneous mixture when mixed therewith. The other reason is that this terpolymer contains carbon monoxide which causes the polyethylene to become adequately photodegradable.

In testing composition (1) above, which contained 10% by weight of the terpolymer ethylene-vinyl acetate-carbon monoxide, we found that the mixture was substantially more photodegradable than the initial polyethylene, but the above state and federal requirements were not met, while its physical properties remained essentially unchanged.

In testing composition (2) above, which contained 15% by weight of the ethylene-vinyl acetate-carbon monoxide terpolymer, we found that this mixture met both photodegradability and toxicity state and federal requirements without seriously diminishing its physical strengths, while functioning well at −20° F.

In testing composition (3) above, we found that this mixture, which contained 20% by weight of ethylene-vinyl acetate-carbon dioxide, met the state and federal photodegradability, as well as the temperature, requirements but did not meet toxicity requirements. It did not seriously diminish its physical strengths.

The above terpolymers have a ratio by weight to the polyethylene of approximately 0.100:1 to 0.270:1, and the melt index of the polyethylene falls within the range of 0.1 to 5.0.

It is evident from the above that, if you introduce a photosensitive material into a polyethylene matrix, the polyethylene will age quickly in the ultraviolet light of sunlight. It also appears that, if that material is ethylene-vinyl acetate-carbon monoxide in the relative quantities as indicated herein, it will make the polyethylene photodegradable without materially changing its physical strengths. We also found that the polymerized mixtures of linear polyethylene and Elvalloy has substantially better physical properties than other photodegradable compositions, particularly at low temperatures.

Another advantage of the above compositions is that the Elvalloy product is reasonably priced so that the end product described above is economical, has superior physical strengths, molds readily, is non-toxic, and is photodegradable.

It can be seen, by reference to the figures for the three above compositions, that the ratio by weight of the ethylene-vinyl acetate-carbon monoxide terpolymer to the linear polyethylene in composition (1) is 0.115:1. Likewise, the ratio by weight of the terpolymer to the linear polyethylene of composition (2) is 0.184:1. Similarly, the ratio by weight of the ethylene-vinyl acetate-carbon monoxide terpolymer to the linear polyethylene in composition (3) is .261:1.

The overall range of the ratio by weight of the ethylene-vinyl acetate-carbon monoxide terpolymer to the linear polyethylene in my invention is 0.100 to 0.270. The melt index of the linear polyethylene used in practicing my above invention is 0.1–5.0.

The composition of the ethylene-vinyl acetate-carbon monoxide terpolymer (Elvalloy) which I have used in the above tests is 65% by weight of ethylene, 24% by weight of vinyl acetate, and 10% by weight of carbon monoxide. The overall range of said components is 45–92.9% by weight of ethylene, 0.1%–40% by weight of vinyl acetate, and 7–15% by weight of carbon monoxide.

From the above, it can be seen that by practicing my above invention, it is now possible to produce shotshell components, at a reasonable cost, which will promptly degrade after firing within the time period prescribed by state and federal authorities. Moreover, such components will have substantially increased strength, as compared to those currently in use, and will have adequate shelf life.

By practicing my invention, manufacturers of shotshells can avoid complicated and complex compounding and molding processes. An important advantage provided by my invention is that the terpolymer which I utilize does not generate free radicals at room temperature which might affect the polyethylene physical strength properties, and such phenomena may be detrimental for shelf life of shotshells.

The degradation and embrittlement rate of the polymer mixture in ultraviolet exposure testing is found to be proportional to the amount of the photosensitive copolymers present in the mixture. The detailed and comprehensive scientific account of the photodegradation mechanism of the polymeric mixture defined herein is beyond the scope of this invention.

In considering this invention, it should be remembered that the present disclosure is illustrative only and the scope of the invention should be determined by the appended claims.

I claim:

1. A photo-degradable, injection molded, high strength plastic shotshell component having a degradation composition comprising as its combination of active ingredients:
   (a) linear polyethylene having a melt index of 0.1–5.0, and
   (b) an ethylene-vinyl acetate-carbon monoxide terpolymer having a ratio by weight to said linear polyethylene of approximately 0.100:1 to 0.270:1, said terpolymer being present in sufficient amounts thereof, to render said linear polyethylene photodegradable.

2. The shotshell component defined in claim 1, wherein said terpolymer has a ratio by weight to said linear polyethylene of about 0.115 to 0.261.

3. The shotshell component defined in claim 1, wherein the ratio by weight of said terpolymer to said linear polyethylene is about 0.184:1.

4. The shotshell component defined in claim 1, wherein the ratio by weight of said terpolymer to said linear polyethylene is about 0.115:1.

5. The shotshell component defined in claim 1, wherein the ratio by weight of said terpolymer to said linear polyethylene is about 0.261:1.

6. The shotshell component defined in claim 1, wherein said terpolymer is comprised of about 65% by weight of ethylene, 25% by weight of vinyl acetate, and 10% by weight of carbon monoxide.

7. The shotshell component defined in claim 1, wherein said terpolymer is comprised of 10–20% by weight of the said composition and is miscible with said linear polyethylene to provide a homogeneous mixture therewith.

8. The shotshell component defined in claim 1, wherein said composition includes about 0.1–5.0% by weight of calcium oxide.

9. The shotshell component defined in claim 1, wherein said composition includes about 0.01–0.5% by weight of calcium stearate.

10. The shotshell component defined in claim 1, wherein said composition includes about 0.1–1.0% by weight of vegetable oil.

11. The shotshell component defined in claim 1, wherein said composition includes about 3% by weight of calcium oxide, 0.1% by weight of calcium stearate and 0.3% by weight of vegetable oil.

12. The shotshell component defined in claim 1, wherein said composition includes about 5% by weight of calcium oxide, 0.1% by weight of calcium stearate and 0.3% by weight of vegetable oil.

13. A photo-degradable, injection molded, high strength plastic shotshell component having a degradation composition comprising as its combination of active ingredients:
   (a) linear polyethylene having a melt index of 0.1–5.0,
   (b) an ethylene-vinyl acetate-carbon monoxide terpolymer, the ratio by weight of said terpolymer to said linear polyethylene being approximately 0.100:1 to 0.270:1, and said ethylene-vinyl acetate-carbon monoxide terpolymer having 45–92.9% by weight of ethylene, 0.1–40% by weight of vinyl acetate, and 7–15% by weight of carbon monoxide, whereby said terpolymer is capable of rendering said linear polyethylene photodegradable.

14. The shotshell component defined in claim 13, wherein the ratio by weight of said terpolymer to said linear polyethylene is approximately 0.115:1.

15. The shotshell component defined in claim 13, wherein the ratio by weight of said terpolymer to said linear polyethylene is approximately 0.184:1.

16. The shotshell component defined in claim 13, wherein the ratio by weight of said terpolymer to said linear polyethylene is approximately 0.261:1.

17. The shotshell component defined in claim 13, wherein said terpolymer is comprised of about 65% by weight of ethylene, 25% by weight of vinyl acetate, 10% by weight of carbon monoxide.

18. The shotshell component defined in claim 13, wherein said composition includes about 0.1–5.0% by weight of calcium oxide.

19. The shotshell component defined in claim 13, wherein said composition includes about 0.01–0.5% by weight of calcium stearate.

20. The shotshell component defined in claim 13, wherein said composition includes about 0.1–1.0% by weight of vegetable oil.

21. The shotshell component defined in claim 1, wherein the ethylene-vinyl acetate-carbon monoxide terpolymer comprises about 10% by weight of the said composition.

22. The shotshell component defined in claim 1, wherein the ethylene-vinyl acetate-carbon monoxide terpolymer comprises about 15% by weight of said composition.

23. The shotshell component defined in claim 1, wherein the ethylene-vinyl acetate-carbon monoxide terpolymer comprises about 20% by weight of said composition.

24. The shotshell component defined in claim 13, wherein the ethylene-vinyl acetate-carbon monoxide terpolymer comprises about 10% by weight of said composition.

25. The shotshell component defined in claim 13, wherein the ethylene-vinyl acetate-carbon monoxide terpolymer comprises about 15% by weight of said composition.

26. The shotshell component defined in claim 13, wherein the ethylene-vinyl acetate-carbon monoxide terpolymer comprises about 20% by weight of said composition.

27. The shotshell component defined in claim 13, wherein the ethylene-vinyl acetate-carbon monoxide terpolymer comprises about 10–20% by weight of said composition.

28. The method of manufacturing photodegradable molded, high strength plastic shotshell components which meet state and federal degradability and toxicity requirements for the photodegradable plastic materials, consisting in formulating a mixture by selecting 74.60%–86.60% by weight of linear polyethylene, selecting 10%–20% by weight of ethylene-vinyl acetate-carbon monoxide selecting 0.1%–5.0% by weight of calcium oxide, selecting 0.01%–0.5% by weight of calcium stearate, and selecting 0.1%–1.0% by weight of vegetable oil; dry blending said selected components of said mixture; pelletizing by extrusion said dry blended components; and thereafter injection-molding shotshell components from said pellets.

29. The method defined in claim 28, wherein the ethylene-vinyl acetate-carbon monoxide is selected to be comprised of approximately 65% by weight of ethylene, approximately 24% by weight of vinyl acetate, and approximately 10% by weight of carbon monoxide.

30. The method defined in claim 28, wherein the ethylene-vinyl acetate-carbon monoxide is selected to be comprised of 45–92.9% by weight of ethylene, 0.1%–40% by weight of vinyl acetate, and 7–15% by weight of carbon monoxide.

31. The method defined in claim 28, wherein the ratio by weight of the ethylene-vinyl acetate-carbon monoxide relative to the linear polyethylene which are selected is approximately 0.115:1 to 0.261.

32. The method defined in claim 28, wherein the ratio by weight of the ethylene-vinyl acetate-carbon monoxide relative to the linear polyethylene which are selected is approximately 0.184:1.

33. The method defined in claim 28, wherein the overall range of the ratio by weight of the ethylene-vinyl acetate-carbon monoxide relative to the linear polyethylene which are selected is approximately 0.100:1 to 0.270:1.

34. The method defined in claim 28, wherein the melt index of the linear polyethylene which is selected is approximately 0.1–5.0.

35. The method defined in claim 28, wherein the ethylene-vinyl acetate-carbon monoxide is selected to be comprised of approximately 10–20% by weight of said mixture and to be miscible with the selected linear polyethylene.

* * * * *

UNITED STATES PATENT AND TRADEMARK OFFICE
CERTIFICATE OF CORRECTION

PATENT NO : 5,795,923
DATED : August 18, 1998
INVENTOR(S): Mohammed Shahid

It is certified that error appears in the above-identified patent and that said Letters Patent are hereby corrected as shown below:

Column 1, the first paragraph beginning, "plastic components" should be corrected to read --Plastic components--.

Column 1, the beginning of the sixth paragraph beginning with "photodegradable components" should be corrected to read --Photodegradable components--.

Claim 28, line 7 (of issued patent), "acetate-carbon monoxide" should be corrected to read --acetate-carbon monoxide,--.

Signed and Sealed this

Twelfth Day of January, 1999

Attest:

Attesting Officer

*Acting Commissioner of Patents and Trademarks*